US005953801A

United States Patent [19]

Hulsebus

[11] Patent Number: 5,953,801

[45] Date of Patent: Sep. 21, 1999

[54] SNAP RING REMOVING TOOL

[75] Inventor: Jon L. Hulsebus, Grandville, Mich.

[73] Assignee: K-Line Industries, Inc., Holland, Mich.

[21] Appl. No.: 08/704,303

[22] Filed: Oct. 15, 1996

[51] Int. Cl.[6] .......... B23P 19/04

[52] U.S. Cl. .......... 29/229; 29/256

[58] Field of Search .......... 29/229, 256, 278, 29/258, 259, 261, 266

[56] References Cited

U.S. PATENT DOCUMENTS

| | | | |
|---|---|---|---|
| 3,112,560 | 12/1963 | Wagoner | 29/229 |
| 3,173,197 | 3/1965 | Tuller | 29/229 |
| 3,266,133 | 8/1966 | Kalbow | 29/229 X |
| 3,378,910 | 4/1968 | Are, Jr. | 29/256 X |
| 4,468,858 | 9/1984 | Gulberg et al. | 29/278 X |
| 4,873,754 | 10/1989 | Gleasman | 29/229 |
| 5,269,053 | 12/1993 | Hicks | 29/256 X |

*Primary Examiner*—Joseph M. Gorski
*Attorney, Agent, or Firm*—Price, Heneveld, Cooper, DeWitt & Litton

[57] ABSTRACT

A tool is provided to remove a snap ring from a shaft of a machine such as a small gas or electric motor. The tool includes two pins that engage the ends of the snap ring and a mechanism for advancing the pins to move the snap ring around the shaft and ultimately off the shaft.

16 Claims, 3 Drawing Sheets

SNAP RING REMOVING TOOL

BACKGROUND OF THE INVENTION

This invention relates to tools, and more particularly to tools that remove a snap ring from a shaft.

Shafts are commonly used in various machines, and very commonly used in small gas and electric motors. Such shafts often employ a "C"-shaped snap ring in an annular groove on the shaft to ensure that the shaft will not move or that a part on the shaft, such as a gear, will not slip past a certain point on the shaft. The snap ring is made of a resilient material that provides an elastic ability which is utilized to keep the snap ring on the shaft.

There often exists a need to remove the snap ring from the shaft to disassemble at least part of the machine that utilizes the shaft assembly. In the past, a screwdriver has been used as a wedge to pry the snap ring from the shaft. Because the shaft is often made of a relatively soft material, the use of a screwdriver often results in damage to the shaft when the screwdriver slips or excessive force is used. Such damage can render the shaft useless and thus add cost to the user.

The use of a screwdriver may also result in the snap ring breaking or being bent out of shape as excessive force is often used to remove the ring. Excessive force will bend the snap ring past its elastic limit and eventually result in breakage of the snap ring. This damage adds to the cost and inconvenience of the user.

SUMMARY OF THE INVENTION

One object of the present invention is to solve the above problems by providing a tool that removes a snap ring from a shaft without damaging either the shaft or the snap ring. Another object of the present invention is to provide a method for removing snap rings from a shaft that will not result in a damaged shaft or snap ring.

To achieve these and other objects of the invention, the tool of the present invention comprises stabilizing means to hold the shaft stable and snap ring engaging means for engaging two ends of a snap ring on a shaft, the snap ring engaging means having two pins. A moving means is employed for moving the pins along the longitudinal axis of the pins to move the snap ring around the shaft to apply pressure to the ends of the snap rings to remove the snap ring from the shaft. The tool effectively removes the snap ring without excessive force or frequent slippage and thus without damage to the shaft or snap ring.

The invention preferably also includes a means to allow the pins to move laterally, thereby resulting in expansion of the snap ring as the pins are moved, in addition to longitudinal movement of the snap ring relative to the pins. The moving means preferably includes a partially threaded bore provided in the body of the tool which receives both a guide, which houses the pins, and a threaded screw, the end of which communicates with the pins. The threaded screw includes a handle that can be used to turn the screw and thereby advance the pins along the guide and shaft to move the snap ring around the shaft.

Still another aspect of the invention is to provide a method for easily removing a snap ring from a shaft without damaging the shaft. To achieve this and other aspects, the method of the present invention includes the steps of stabilizing the shaft along its longitudinal axis, engaging two ends of a snap ring with two pins, and moving the pins longitudinally relative to the longitudinal axis of the pins to apply pressure to the ends of the snap ring to remove the snap ring from the shaft.

These and other features, objects and advantages of the present invention will become apparent upon reading the following description thereof together with reference to the accompanying drawings.

DETAILED DESCRIPTION OF THE PREFERRED EMBODIMENT

Figures 1, 3, 6:
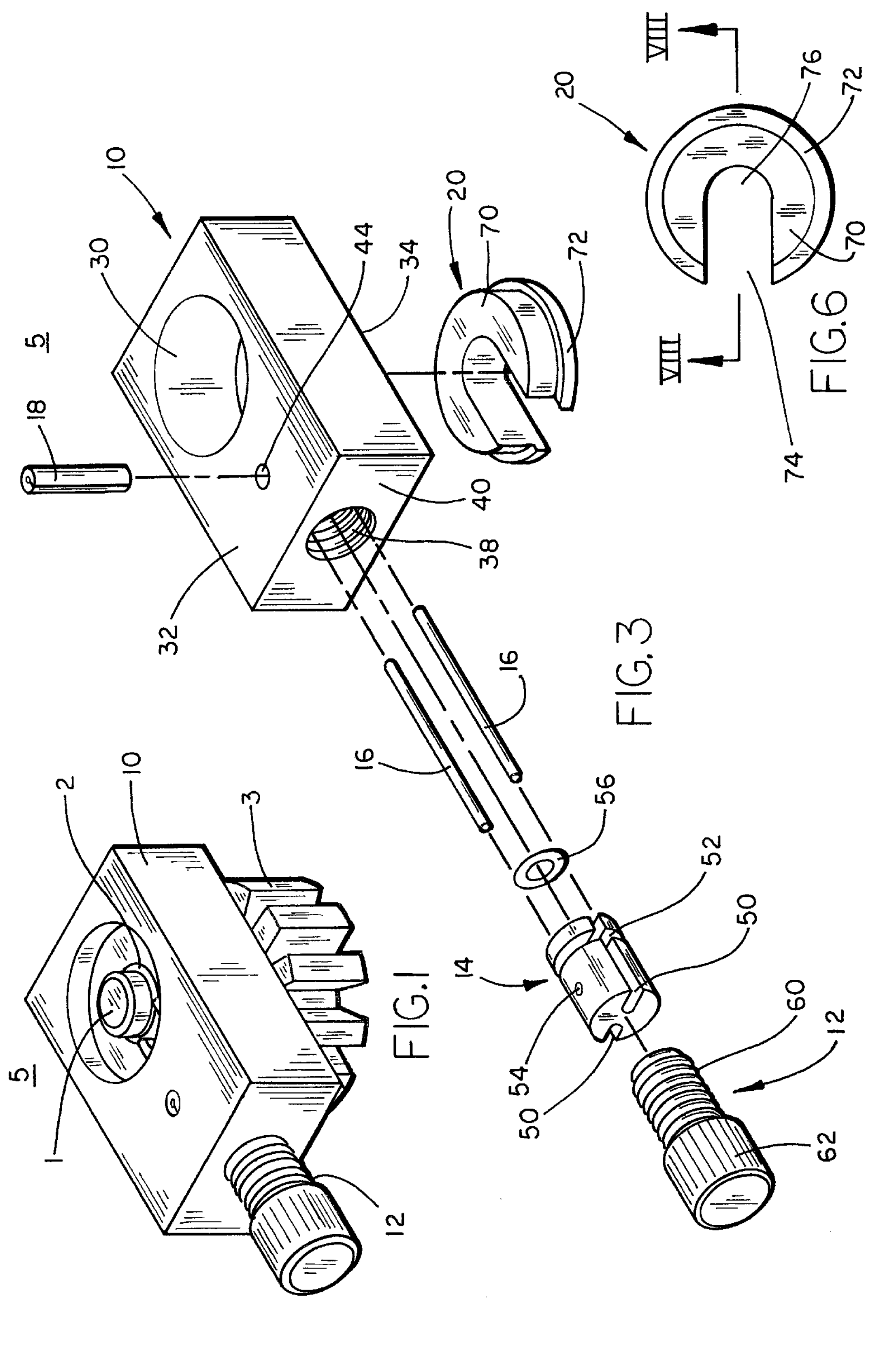
FIG. 1 is a perspective view of the tool of the present invention engaged with a snap ring on a gear shaft.
FIG. 3 is an exploded perspective view of the tool of the present invention including the adaptor.
FIG. 6 is a top elevational view of an adaptor for use with the tool of the present invention.
Figure 2:
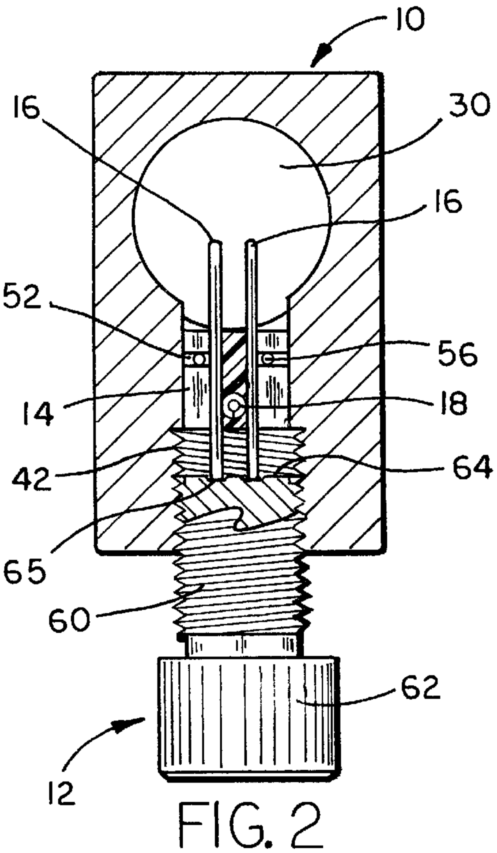
FIG. 2 is a top cross-sectional view of the tool constructed in accordance with the present invention.

The drawings show a preferred embodiment of a snap ring removing tool according to the present invention. FIG. 1 shows the preferred embodiment of the present snap ring removing tool 5 in use as it is placed over a shaft 1 upon which a gear 3 is mounted. The structure of the present invention includes a snap ring engaging means having two pins for engaging two ends of a snap ring on a shaft, stabilizing means for holding the shaft substantially fixed, and moving means for moving the pins longitudinally relative to the longitudinal axis of the pins to apply pressure to the ends of the snap ring. As shown in FIG. 2, the preferred embodiment includes a body 10, a threaded screw 12 and a guide 14, both received in body 10, two pins 16 received in guide 14, and a locking pin 18 which attaches guide 14 to body 10. An adaptor 20, which is described in detail below, may also be used with the tool. Body 10 is preferably made of a durable, resilient material such as steel and is preferably of such a size and configuration to fit comfortably in a person's hand. Body 10 includes a relatively large bore 30 which extends from the top (32) of body 10 to the bottom (34). Large bore 30 is preferably formed with a countersink 36 at bottom 34 that extends a short distance upward and serves as a receiving means for receiving and holding adaptor 20. The preferred embodiment also includes a threaded bore 38 which extends from an end 40 of body 10 and terminates at large bore 30. In the illustrated embodiment, the longitudinal axis of threaded bore 38 crosses the longitudinal axis of large bore 30 orthogonally. Threaded bore 38 contains threads 42 which extend from end 40 to a point near the midpoint between end 40 and large bore 30. The remaining portion of threaded bore 38 between the threaded portion and large bore 30 is preferably substantially smooth, although the entire bore 38 could be threaded. Body 10 also includes a small bore 44 near large bore 30. Small bore 44 extends from top 32 to bottom 34 and extends through the smooth portion of threaded bore 38.

Guide 14 is generally cylindrical and preferably made of a durable, smooth material such as polyvinylchloride to provide durability as well as a smooth surface for pins 16 to slide along. As shown in FIG. 3, guide 14 includes two laterally opposed notches 50 which extend the entire length of guide 14. An annular groove 52 is positioned near one end of guide 14 and a hole 54 extending through guide 14 is positioned at a midpoint between the two ends of guide 14 such that it does not interfere with notches 50. Each of pins 16 is received in one of notches 50. Pins 16 are preferably cylindrical in shape, although not limited to such a shape, and made of a resilient material. A band 56 is received in annular groove 52 and holds pins 16 in notches 50 but allows longitudinal movement of pins 16 as well as limited lateral movement. Band 56 should be flexible and is preferably made of rubber or other similarly flexible material. Guide 14 is received in threaded bore 38 with band 56 and pins 16 in place and hole 54 aligned with small bore 44 such that the longitudinal axes of pins 16 are parallel with the longitudinal axis of threaded bore 38. Locking pin 18 is made of a resilient material and is generally cylindrical with a diameter slightly larger than small bore 44 or hole 54. Locking pin 18 is configured so it can be bent slightly to have a diameter slightly smaller than small bore 44 and hole 54 and is pushed through the top portion of small bore 44, through hole 54 and through the bottom portion of small bore 44. Once in place, locking pin 18 is expanded by increasing its diameter, locking itself and guide 14 in place. Locking pin 18 is the same height as body 10 and is positioned so that its ends are flush with both top 32 and bottom 34 of body 10.

Threaded screw 12 is generally cylindrical and is preferably made of the same material as body 10. Threaded screw 12 includes both a threaded cylindrical portion 60 and a handle 62. Threaded screw 12 also includes an end 64 which terminates the threaded cylindrical portion. End 64 preferably has a circular groove 65 formed thereon for engaging the interior ends of pins 16 while maintaining a fixed distance between the interior ends of pins 16. Threaded screw 12 is received in threaded bore 38, threaded cylindrical portion 60 being threadably engaged with threads 42. Threaded screw 12 is screwed into threaded bore 38 until circular groove 65 on end 64 communicates with pins 16.

Figure 7:
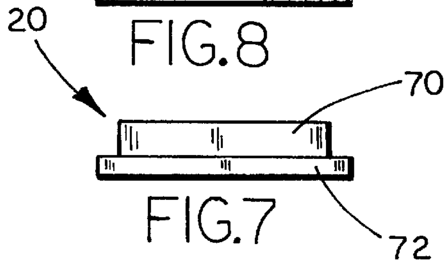
FIG. 7 is a side elevational view of the adaptor.
Figure 9:
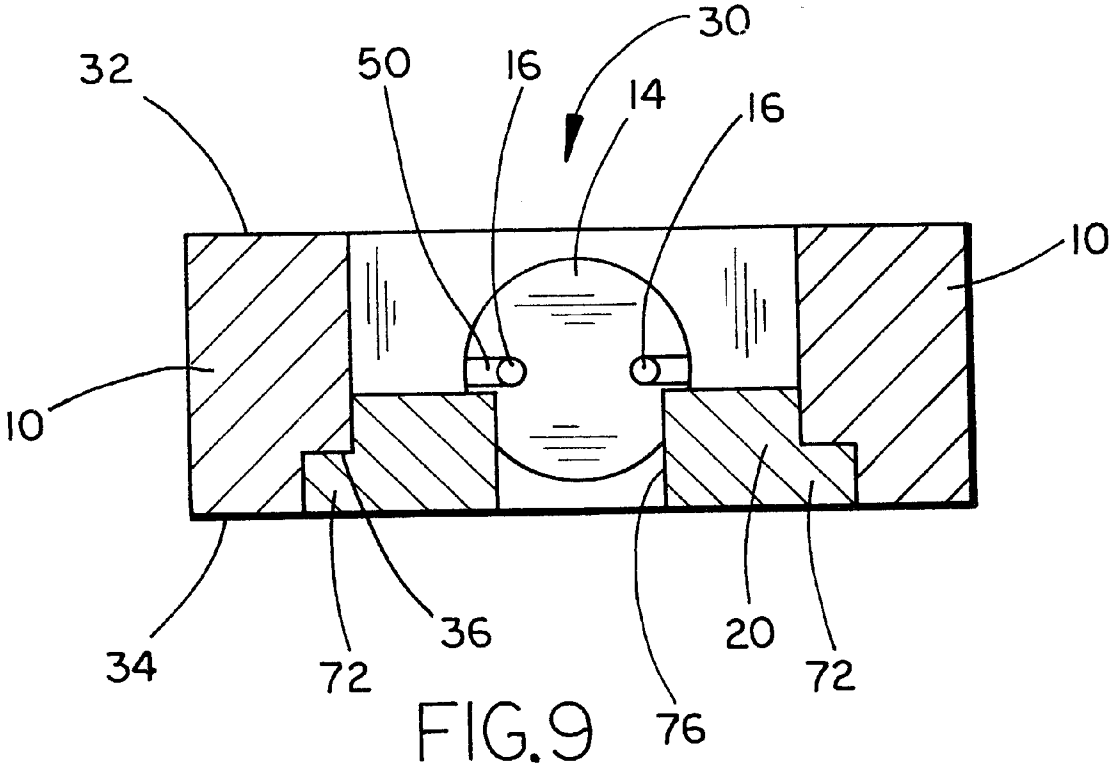
FIG. 9 is a cross-sectional view of the tool of the present invention used with the adaptor taken along line IX—IX of FIG. 4.

An adaptor 20 may also be used with the preferred embodiment of the present invention. Adaptor 20 should be made of a resilient material and preferably made of the same material as body 10. As shown in FIG. 6, adaptor 20 is generally cylindrical in nature and includes a top portion 70 which has a diameter slightly smaller than that of large bore 30. Likewise, bottom portion 72 has a diameter slightly smaller than that of countersink 36. Adaptor 20 thus fits snugly into large bore 30 and countersink 36 and is held in place by friction. FIG. 7 shows the relative heights and diameters of top portion 70 and bottom portion 72. Adaptor 20 also includes a slot 74 which begins at the outer edge of bottom portion 72 and terminates in a semicircular portion 76 near the center of adaptor 20. The width of slot 74 and diameter of semicircular portion 76 are preferably the same size and are of such a size that a gear shaft of small gas motor will easily fit inside slot 74 and semicircular portion 76. As shown in FIG. 9, top portion 70 extends only a short distance into large bore 30 and not fully to top 32 when adaptor 20 is fitted into large bore 30 and countersink 36. Preferably, adaptor 20 is constructed such that its top surface does not extend into large bore 30 to the depth at which pins 16 extend into large bore 30. By selecting a height for bottom portion 72 that is substantially equal to the depth of countersink 36, the bottom surface of adaptor 20 may be flush with bottom 34 and adaptor 20 may be prevented from extending too far into large bore 30 so as to obstruct the removal of snap ring 2.

Figure 4:
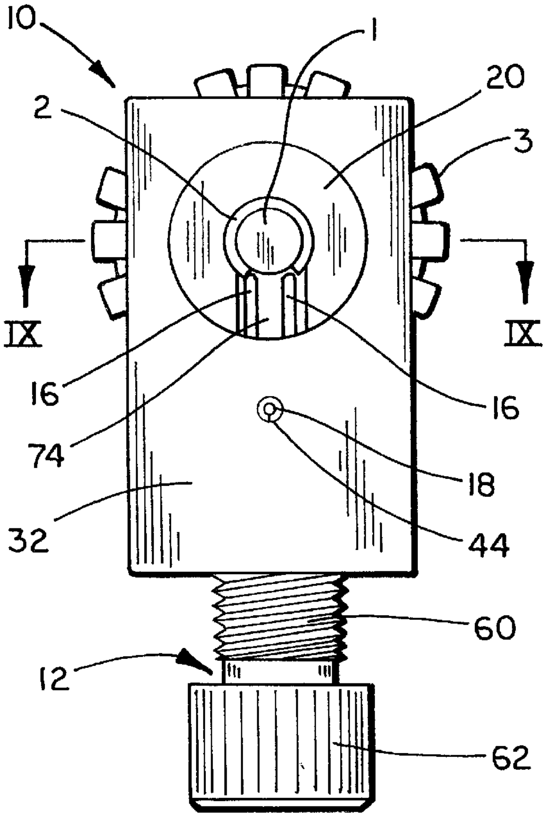
FIG. 4 is a top elevational view of the tool of the present invention engaged with a snap ring on a gear shaft.

FIG. 4 shows the preferred embodiment in its initial stage of use. Illustrated is the preferred embodiment after it has been slid over shaft 1 with pins 16 each engaged with one of the ends of snap ring 2. Adaptor 20 is in place in the illustrated embodiment and groove 74 is used to hold shaft 1 stable while the tool is in use. The tool is operated by turning handle 62 to advance pins 16. Threaded screw 12 is used to advance pins 16 longitudinally through guide 14 by manually screwing threaded screw 12 further into threaded bore 38 using handle 62. Because end 64 is in communication with pins 16, pins 16 are pushed further into large bore 30 when threaded screw 12 is advanced into threaded bore 38.

Figure 5:
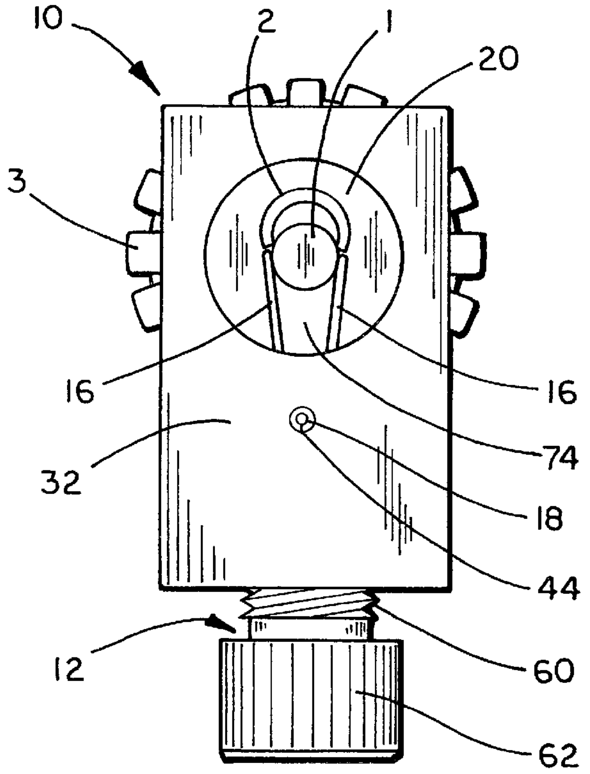
FIG. 5 is a top elevational view of the tool of the present invention engaged with a nearly-removed snap ring on a gear shaft.
Figure 8:
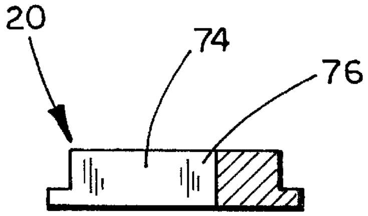
FIG. 8 is a cross-sectional view of the adaptor taken along line VIII—VIII of FIG. 6.

FIG. 5 shows the tool in use after handle 62 has been turned a few rotations. As pins 16 are advanced longitudinally, pins 16 also move laterally around shaft 1 to simultaneously slide both ends of snap ring 2 around and off of shaft 1. As is shown, adaptor 20 holds shaft 1 stable while snap ring 2 is removed. Another partial turn of handle 62 in FIG. 5 will result in snap ring 2 becoming detached from shaft 1. By simultaneously applying pressure to both ends of snap ring 2, snap ring 2 may be removed cleanly without any damage to either shaft 1 or snap ring 2.

The previously described versions of the present invention have many advantages, including the ability to remove a snap ring from a shaft easily and without damage to either the snap ring or the shaft that employs the snap ring.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

I claim:

1. A device comprising:

a body having two ends, two sides, a top and bottom, a first bore and a second bore, said first bore starting at the top and extending to said bottom, said second bore starting at an end and terminating at said first bore;

a guide having two openings and secured in said second bore;

two elongated pins, one received in each opening of said guide and extending into said first bore;

flexible means for holding said pins substantially stable while allowing lateral movement of at least one of said pins relative to the longitudinal axis of said pins; and moving means for advancing said pins longitudinally relative to the longitudinal axis of said pins further into said first bore.

2. The device according to claim 1, and further including an adaptor conformed to be received in said first bore.

3. The device according to claim 1, wherein the openings of said guide are two notches.

4. The device according to claim 3, wherein said guide includes a first end and a second end and said notches are laterally opposed and extend from the first end of the guide to the second end of the guide.

5. The device according to claim 1, wherein said guide is cylindrical in shape and has an annular recess near the first end of said guide.

6. The device according to claim 5, wherein said flexible means includes an elastic ring, said elastic ring being received in said annular recess and around said pins.

7. The device according to claim 1, wherein said second bore contains screw threads and said advancing means includes a screw having a threaded cylindrical length about which are formed screw threads threadably engaging said screw threads within said second bore, one end of said threaded cylindrical length being in communication with said pins so as to push said pins through said guide when said screw is rotated in a given direction.

8. The device according to claim 1, wherein said body includes a third bore, said third bore extending from said top of said body to said bottom, through said second bore, wherein said guide is secured within said second bore by a locking pin extending from said top of said body through said guide and to said bottom of said body.

9. A snap ring removing device comprising:

a body having two ends, two sides, a top, a bottom, and a first bore having screw threads;

a guide having two notches and secured in said first bore, said guide including a first end and a second end and said notches laterally opposed and extending from said first end of the guide to said second end of the guide;

two elongated pins, one received in each notch of said guide;

a second bore extending from the top to the bottom and acting as a stabilizing means;

flexible means for holding said pins substantially stable while allowing lateral movement of at least one of said pins relative to the longitudinal axis of said pins; and moving means including a screw having a threaded cylindrical length about which are formed screw threads threadedly engaging said screw threads within said first bore, one end of said threaded cylindrical length being in communication with said pins so as to push said pins through said guide when said screw is rotated in a given direction.

10. The device according to claim 9, wherein said guide is cylindrical in shape and has an annular recess near the first end of said guide.

11. A snap ring removing device comprising:

a body having two ends, two sides, a top, a bottom and a first bore;

a cylindrical guide having two openings and an annular recess near its first end, and secured in said first bore;

two elongated pins, one received in each opening of said guide; and flexible means for holding said pins substantially stable while allowing lateral movement of at least one of said pins relative to the longitudinal axis of said pins and having an elastic ring being received in said annular recess and around said pins.

12. The device according to claim 11, and further including moving means for advancing said pins longitudinally relative to the longitudinal axis of said pins.

13. The device according to claim 11, and further including an adaptor conformed to receive a shaft.

14. The device according to claim 11, wherein the openings of said guide are two notches.

15. The device according to claim 14, wherein said guide includes a first end and a second end and said notches are laterally opposed and extend from the first end of the guide to the second end of the guide.

16. The device according to claim 15, further including a second bore, said second bore extending from the top to the bottom and acting as a stabilizing means.

* * * * *